United States Patent [19]
Long et al.

[11] Patent Number: 5,805,822
[45] Date of Patent: Sep. 8, 1998

[54] CHANNEL INTERFACE WITH DATA SEGMENTATION AND RE-SEGEMENTATION

[75] Inventors: Lynn Douglas Long, Chapel Hill; Louis Frank Menditto, Raleigh; Masashi Edward Miyake, Chapel Hill; Arthur James Stagg, Raleigh; Raymond Edward Ward, Durham, all of N.C.

[73] Assignee: International Business Machine Corp., Armonk, N.Y.

[21] Appl. No.: 772,478

[22] Filed: Dec. 23, 1996

Related U.S. Application Data

[63] Continuation of Ser. No. 596,878, Jan. 11, 1996, abandoned, which is a continuation of Ser. No. 252,019, Jun. 1, 1994, abandoned.

[51] Int. Cl.[6] .................................................. G06F 15/177
[52] U.S. Cl. ................................ 395/200.62; 395/200.6; 395/898; 395/853
[58] Field of Search ..................................... 395/821, 831, 395/200.62, 898, 853, 200.6; 370/81, 84

[56] References Cited

U.S. PATENT DOCUMENTS

| | | | |
|---|---|---|---|
| 4,229,622 | 10/1980 | Cochrane ................................... | 370/81 |
| 4,553,234 | 11/1985 | Brandsma et al. ........................ | 370/26 |
| 4,658,152 | 4/1987 | Walters ..................................... | 370/84 |
| 4,745,599 | 5/1988 | Rauchaudhuri ............................ | 570/93 |
| 4,843,541 | 6/1989 | Bean et al. ................................ | 395/275 |
| 4,941,089 | 7/1990 | Fischer ...................................... | 395/325 |
| 5,005,170 | 4/1991 | Nelson ........................................ | 370/84 |
| 5,065,398 | 11/1991 | Takashima ............................... | 370/94.1 |
| 5,109,483 | 4/1992 | Baratz et al. ............................. | 395/200 |
| 5,138,615 | 8/1992 | Lamport et al. ......................... | 370/94.3 |
| 5,181,017 | 1/1993 | Frey et al. ........................... | 340/825.02 |
| 5,206,933 | 4/1993 | Farrell et al. ............................. | 395/200 |
| 5,289,579 | 2/1994 | Punj ........................................... | 395/200 |
| 5,305,104 | 4/1994 | Jensen et al. ............................. | 348/473 |
| 5,329,623 | 7/1994 | Smith et al. ............................. | 395/275 |
| 5,367,643 | 11/1994 | Chang et al. ............................. | 345/325 |
| 5,546,549 | 8/1996 | Barrett et al. ............................. | 395/309 |

FOREIGN PATENT DOCUMENTS 0350238  1/1990  European Pat. Off. .

*Primary Examiner*—Mehmet B. Geckil
*Attorney, Agent, or Firm*—Jerry W. Herndon

[57] ABSTRACT

A multi-path channel interface for computer input-output systems includes the ability to define and activate unbalanced groups of unidirectional communications sub-channels for a user application. Protocol independent exchange identifications permit not only unbalanced transmission groups but also allow user-controlled extensions for negotiating the values of transmission parameters at the time the transmission group is activated. When error correcting re-transmissions force the re-segmenting of data blocks, second level sub-segment indexing assure the proper order of delivery of the various segments and sub-segments. The exchange identifications include an identification of the user protocol being supported and thus permit interfacing with any user protocol.

12 Claims, 6 Drawing Sheets

CHANNEL INTERFACE WITH DATA SEGMENTATION AND RE-SEGEMENTATION

This is a continuation of application Ser. No. 08/596,878 filed Jan. 11, 1996 now abandoned, which was a continuation of application Ser. No. 08/252,019 file Jun. 1, 1994 now abandoned.

TECHNICAL FIELD

This invention relates to data transfer mechanisms and, more particularly to multi-channel, user transparent, unbalanced, dynamically alterable computer input and output channels.

BACKGROUND OF THE INVENTION

Mainframe computer systems such as the IBM S/390 exchange data between input/output devices and main storage by I/O operations collectively known as the channel subsystem. The I/O devices and their control units attach to the channel subsystem. The channel subsystem is a combination of hardware and software which directs the flow of information between the control units of the I/O devices and main storage to relieve the computer Central Processing Unit (CPU) of the task of communicating with the I/O devices. Input and output processing can therefore take place concurrently with normal data processing in the CPU. I/O processing includes path management, testing paths for availability, choosing an available channel path and initiating and terminating the execution of I/O operations with the I/O device. A control unit is a mechanism for converting the characteristics of a particular I/O device to the standard forms used by the channel subsystem.

In accordance with prior art input-output operations, a sub-channel is provided for and dedicated to each I/O device accessible to the channel subsystem. Such sub-channels are logical rather than physical transmission paths and are defined in terms of the specific requirements of the associated I/O device. The number of such sub-channels is limited only by address sizes recognized by the computer system. Thus, in accordance with prior art input-output operations, I/O devices are attached to the channel subsystem by means of logical sub-channels derived on the physical transmission media (called channel paths) and activated when I/O operations are required. Logical sub-channels are defined as transmission facilities for varying sized data packet lengths ranging from zero to 32 kilobytes in four kilobyte steps. I/O control units are attached to the channel subsystem by one or more of such logical sub-channels and an I/O device can be served by one or more control units. Most I/O devices are designed to transfer data at only one specific rate and must be served by a logical sub-channel equaling or exceeding this device rate. Although the physical transmission media can be operated in half or full duplex mode, logical sub-channels have, for simplicity, nevertheless been defined for both directions of transmission to support both input and output. The prior art provided only for logical transmission sub-channels which are equal, balanced and symmetrical for both directions of transmission. Devices were assigned unique sub-channels during their installation and communication over that sub-channel conformed to the communication protocols defined for that type of I/O device. Note that all sub-channels in the prior art are predefined for a particular I/O destination, are balanced, and are merely activated when the system requests I/O. A great deal of computer input and output programming exists using the protocols described above.

The number of logical sub-channels in such a system is independent of the number of channel paths; the same I/O device can be accessed by a number of different channel paths, represented by a single logical sub-channel. The logical sub-channel maintains the main store addresses where the data is to be read or written, a count of the data transferred, the identity of the destination and storage for status information about the connected I/O device. This status information is accessible by programmed processes. Historically, logical sub-channels were derived over multi-conductor cables with bits transferred in parallel over different copper conductors (byte multiplex mode). Such cables were limited in length (30–50 meters) and bandwidth (1.5–4.5 Mb/s) and much existing I/O programming is adapted to these limitations. This older type of transmission medium is know as the parallel I/O interface and is further described in "IBM System/360 and System/370 I/O Interface Channel to Control Unit OEMI (Original Equipment Manufacturer Interface)," IBM System Library document GA22-6974, available from the IBM Corporation.

More recently, new optical fiber media have become available for interconnecting mainframes with I/O devices. This is a serial I/O interface for the channel subsystem, has a bandwidth of at least 20 Mbytes/s and can be extended by many kilometers (50–60 kilometers) by RCE repeaters (Remote Channel Extenders). One type of serial interface channel path is known as an ESCON (Enterprise System Connectivity) channel and is further described in "IBM Enterprise Systems Architecture/390 ESCON I/O Interface," IBM System Library Document SA22-7202, also available from the IBM Corporation. The ESCON serial I/O interface utilizes bursts of serial bit packets (burst mode) and presents problems to the standard I/O sub-channel system due to the higher capacity bandwidth, the delay latency inherent in the longer distances covered by the medium, system integrity (assuring matching logical assignments at both ends of the medium), and synchronization problems arising from these changing physical parameters.

One basic problem, then, in the channel subsystem is the inflexibility in defining and activating sub-channels. In modem applications such as Systems Network Architecture (SNA) and Advanced Peer-to-Peer Networks (APPN), greater flexibility is desirable, adapting to both byte multiplex and burst mode transmission paths in such a fashion as to be transparent to the existing user applications designed when only the byte multiplex mode was available. In addition, the possibility of breaking long data streams into segments for transmission over different logical sub-channels which might be implemented over different channel paths increases the sequencing problem, particularly in the face of channel path failures. Moreover, some degree of dynamic control over the parameters of I/O sub-channels is useful, and sometimes necessary, in advanced systems such as SNA and APPN. For example, users may need to negotiate such things as receiver buffer size or maximum transmission link capacity available. Finally, many modem devices and systems do not require balanced transmission channels having the same capacity in both directions since many multimedia applications involve minor control activities to control very wide broadband multimedia signals.

More particularly, it has been common in the past to provide for I/O devices comprising simple devices such as printers, magnetic tape units, magnetic disk units, terminals and sub-channels of other data processing systems. Today, however, such computers communicate with devices at great geographical distances connected by long transmission systems which might include local or wide area networks. Such interconnected systems have different requirements than simpler I/O devices. In particular, as noted above, services such as multimedia distribution require heavily unbalanced transmission capabilities for the two opposite directions of transmission. In addition, it is not always possible to have predetermined knowledge of the facilities available at the other end of a long I/O channel, and provision is not available in the prior art I/O supervisors to communicate the necessary parameters between the two ends of the sub-channel. Some form of system security is also desirable to ensure that the two ends of the sub-channels have the proper permissions for interconnection. Finally, the possibility of breaking large data blocks into segments for re-transmission in the face of channel path failures raises the possibility of segment and sub-segment sequencing problems not present in simple single sub-channel systems.

Today's channel attached computer configurations present a radically different environment from the traditional channel environment. Previously, it was possible to assume geographic proximity which implied a degree of local control over important aspects of the channel system design. Today's more vibrant and diversified channel environment gives rise to a number of system design problems. For example, channel security was easy to ensure when distances were limited to units expressed in terms of meters and there was little opportunity for an invasion of the system by a hostile system. In contrast, today's channel distances are measured in units of kilometers. Channel extender technology expands that distance to world-wide connectivity. In addition, earlier systems provided a degree of security by the use of pre-defined, static definitions. The flexibility of dynamic definitions also gives rise to increased exposure to invasion by a hostile system.

Another problem with prior art channel systems is the implied local knowledge of the buffering capacity of a sub-channel partner. In such prior art systems, any given implementation specific to a sub-channel partner assumed values for the partner's capacity. If in error, these assumptions lead to significant system inefficiencies. Similarly, statically pre-defined directions of transmission, either half duplex or simplex, is often unsuitable for particular data transfers. Dynamically defined and changeable directions of transmission would better suit today's more flexible data transfer requirements. Finally, user applications are normally designed with a particular device or device type in mind and the higher user level protocols are adapted to this particular device or device type. This requires the implementation of an interface for each user application to adapt the user protocols to the channel subsystem. A single methodology could replace these existing interfaces by providing a single set of system interfaces.

Prior art channel interfaces provide for only balanced bandwidth allocation interfaces. Such balanced allocation interfaces require that the transmit, or write, bandwidth is equal to the receive, or read, bandwidth. While this approach is suitable and, indeed, desirable, in a prior art transactions or low performance batch environments due to the essentially balanced data flow, today's client/server environments, by their very nature, dictate heavily unbalanced bandwidth interfaces. Similarly, new Asynchronous Transfer Mode (ATM) services on Wide Area Networks (WANs) likewise provide for unbalanced network interfaces.

SUMMARY OF THE INVENTION

In accordance with the illustrative embodiment of the present invention, a multi-path channel (MPC) interface is provided which forms a transparent interface between the prior art I/O channel-using user applications and the prior art channel path I/O supervisor processes for both byte multiplex and burst mode transmission paths. More particularly, a new I/O interface is provided which allows the user application to define multi-path channel groups (MPCs) for its use which may comprise unbalanced transmission capabilities between the computer host and the remote facility. In addition, user data is blocked to take advantage of the available transmission sub-channels and re-transmitted over the same or different sub-channels when data errors are detected. Segmenting mechanisms are provided to assure proper re-assembly of the data stream in the face of divergent delays in initial transmission and error correcting re-transmissions of data packets. Such re-transmissions are particularly troublesome when it is necessary to re-segment data blocks to accommodate smaller capacity sub-channels available for such re-transmission. In accordance with the present invention, such sequence integrity is maintained by sub-segmented data blocks for error correcting re-transmission. In further accord with the present invention, the normal exchange identification messages between the ends of I/O sub-channels are adapted for users to dynamically convey information to the other end of an I/O sub-channel about the facilities available to handle the I/O signals, such as buffer size or data link limitations.

In further accordance with the illustrative embodiment of the present invention, when data segments must be re-transmitted following a channel path failure, a segment sub-indexing facility is used to tag the sub-segments of a transmission block previously transmitted, but not received. Since such re-transmission must take place over sub-channels in the transmission group that are still operational, it may well be that the available sub-channels individually have insufficient capacity to transmit the re-transmitted segment. It then becomes necessary to re-segment the re-transmitted segment to fit the available sub-channels. Such re-segmentation, in turn, gives rise to the possibility of receiving the sub-segments out of order. The sub-segment indexing provides the necessary tag to properly reassemble the original transmission block from the segments and sub-segments, regardless of the order of their reception. A data reception queue is, of course, included to reassemble the user data into the order in which it was transmitted prior to its presentation to the multi-path channel interface.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
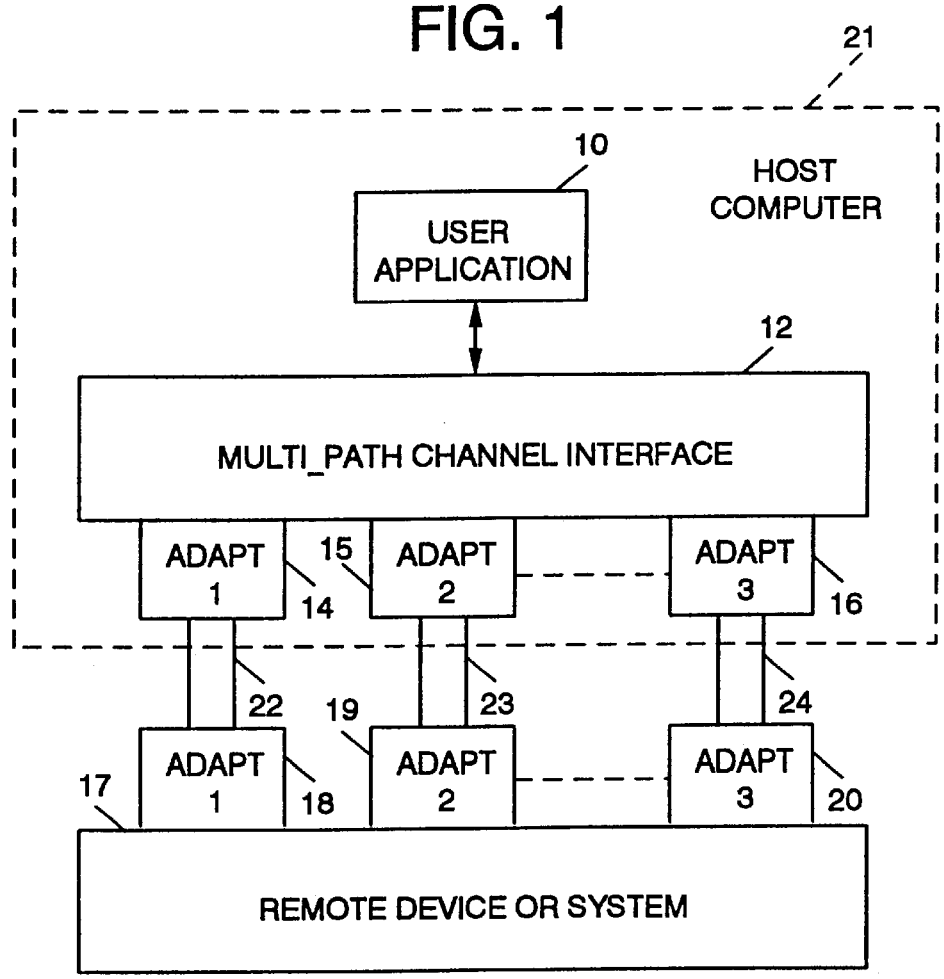
FIG. 1 shows a general block diagram of a computer input-output system in which the multi-path channel interface of the present invention will find use.

Referring more particularly to FIG. 1, there is shown a general block diagram of a computer input-output system for a host channel attached computer 21 and comprising a user application 10 executing on computer 21 and requiring input-output (I/O) capabilities. Computer 21 also includes a multi-path channel interface 12 which controls the input and output of data between computer 21 and a remote device or system 17 over one or more channel paths 22, 23 or 24. Channel paths 22–24 utilize adapters 14, 15, 16, 18, 19 and 20 to convert data signals for transmission on media 22–24. Multi-path channel interface 12 controls the connection of user data signals from user application 10 to media 22–24 by packaging the data in protocol data units (PDUs) suitable for the channel paths 22–24. Devices or system 17 may comprise simple I/O devices such as printers, storage systems or terminals, or may comprise another host computer with which user application 10 wishes to communicate. System 17 may also comprise a gateway to a local area or wide area data distribution network having remotely located computers or I/O devices attached thereto.

More particularly, channel paths 22, 23, . . . , 24 may comprise standard byte multiplex multi-conductor cables, burst mode optical fibers or any other form of transmission media over which data blocks can be transmitted. The number of such channel paths can vary all of the way from a single half or full duplex path to as many as are required or desired to carry the data to be transmitted from computer 21. For simplicity, each of channel paths 22–24 is assumed to be used in the half duplex mode, transmitting in only one direction at a time. While the direction of transmission can be reversed, the possibly high delay latency dictates that such reversals be minimized. The modifications necessary to take advantage of full duplex operation of paths 22–24 are believed to be obvious and will not be further described here.

In accordance with the present invention, a multi-path channel interface 12 is connected between user application 10 and channel paths 22–24 to provide a transparent interconnection between the prior art user application 10 and the prior art channel paths 22–24 which affords the same level of function in modem data transfer environments that was available in the prior art simpler and more localized systems.

More particularly, a new set of exchange identification (XID) messages have been defined (to be discussed in connection with FIGS. 5 through 8) which provide the user with a set of functions which meet basic system interface requirements and, in addition, provide a set of optional user-defined data areas which can be used to implement application-specific requirements, some of which will be described below, but which include the negotiation of system parameters and the provision of user-supplied system verification (security) fields (e.g., encrypted passwords). The exchange of system parameters such as buffering size and control, data flow direction and higher level user protocol support permits efficient and rapid input-output data exchanges.

Figure 2:
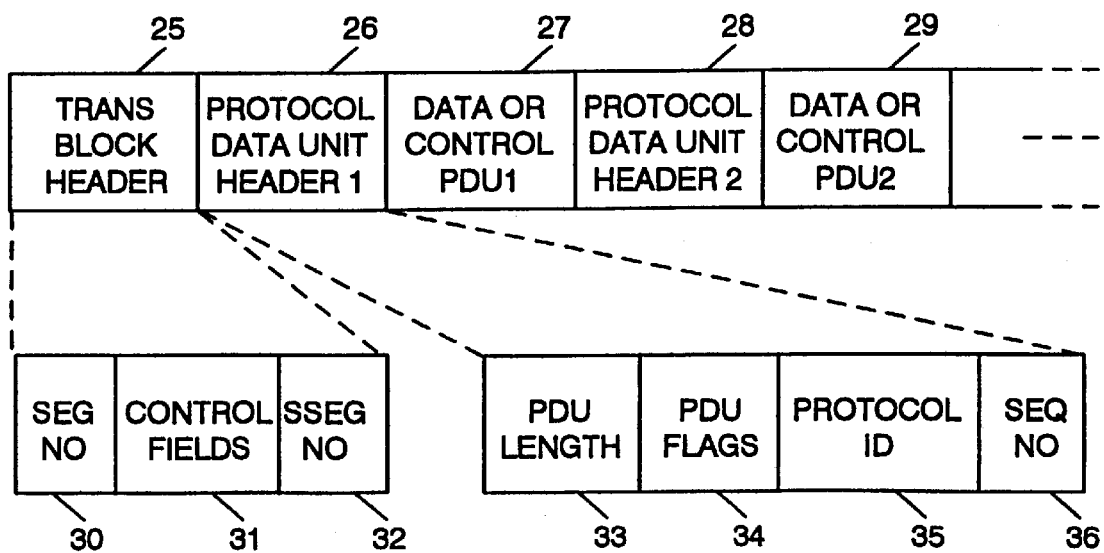
FIG. 2 shows a graphical representation of the structure of transmission blocks used for communication of input and output data and control signals in the system of FIG. 1 in accordance with the present invention.

Before proceeding to a detailed description of the multi-path channel interface 12 of FIG. 1, the format of data and control signals transmitted on transmission paths 22–24 in accordance with the prior art will be described. In FIG. 2 there is shown a graphical representation of a typical transmission block on transmission paths 22–24 comprising a transmission block header 25 followed by one or more protocol data units (PDUs) 27, 29, each having its own header 26 and 28, respectively. Thus PDU1 27 has a PDU header 26 and PDU2 29 has a PDU header 28. Some of the details of headers 25, 26 and 27 are also shown in FIG. 2 in the block below header 25 and connected by dashed lines to header 25. Thus, transmission block header 25 is shown as including a segment number field 30 used to contain a number representing the sequence of this block in a plurality of blocks of data transmitted from the same user application 10 to the same destination. Also included in transmission block header 25 is a plurality of control fields 31 containing information necessary for various control actions at the remote end, particularly when the transmission block is intended for transmission on a packet network system at the remote end. Also included in control fields 31 is a flag marking the last segment of a sub-segmented user data block. Field 32 contains a sub-sequence number for this block when the original segment (such as the entire transmission block of FIG. 2) is re-segmented into smaller sub-segments when required for re-transmission after a failure to receive the original block. This sub-segments number is used, as will be described later, to recapture the proper sequence of sub-segments after reception at the remote end of the channel path.

Each of PDUs 27, 29, . . . , has a PDU header comprising a PDU length field 33 and a PDU flag field 34. Note that PDUs can contain either user data or MPC control information. One of the flags in field 34 indicates whether the following information is user data or MPC control signals. One type of such MPC control signal are the Exchange Identification (XID) signals to be discussed in connection with FIGS. 5 through 8. Flags are also available in field 34 to indicate the type of data unit, if appropriate, and to identify the last PDU in a transmission block. Protocol identification field 35 is used to identify the protocol used by the user application which was the source of this data PDU. This protocol identification allows the remote system to process the user data with the appropriate protocol processing and makes the sub-channel control process independent of the protocol of the user application 10 of FIG. 1. PDU header 26 also includes a sequence number field 36 to establish the initial sequence of a plurality of PDUs blocked together in the transmission block should such sequence numbers become necessary for re-assembly of a disassembled transmission block. As will be described in connection with FIGS. 8–12, control PDUs may include optional fields which can be used by the user application to negotiate the values of variables to be used in blocking and queuing of user data.

Figure 3:
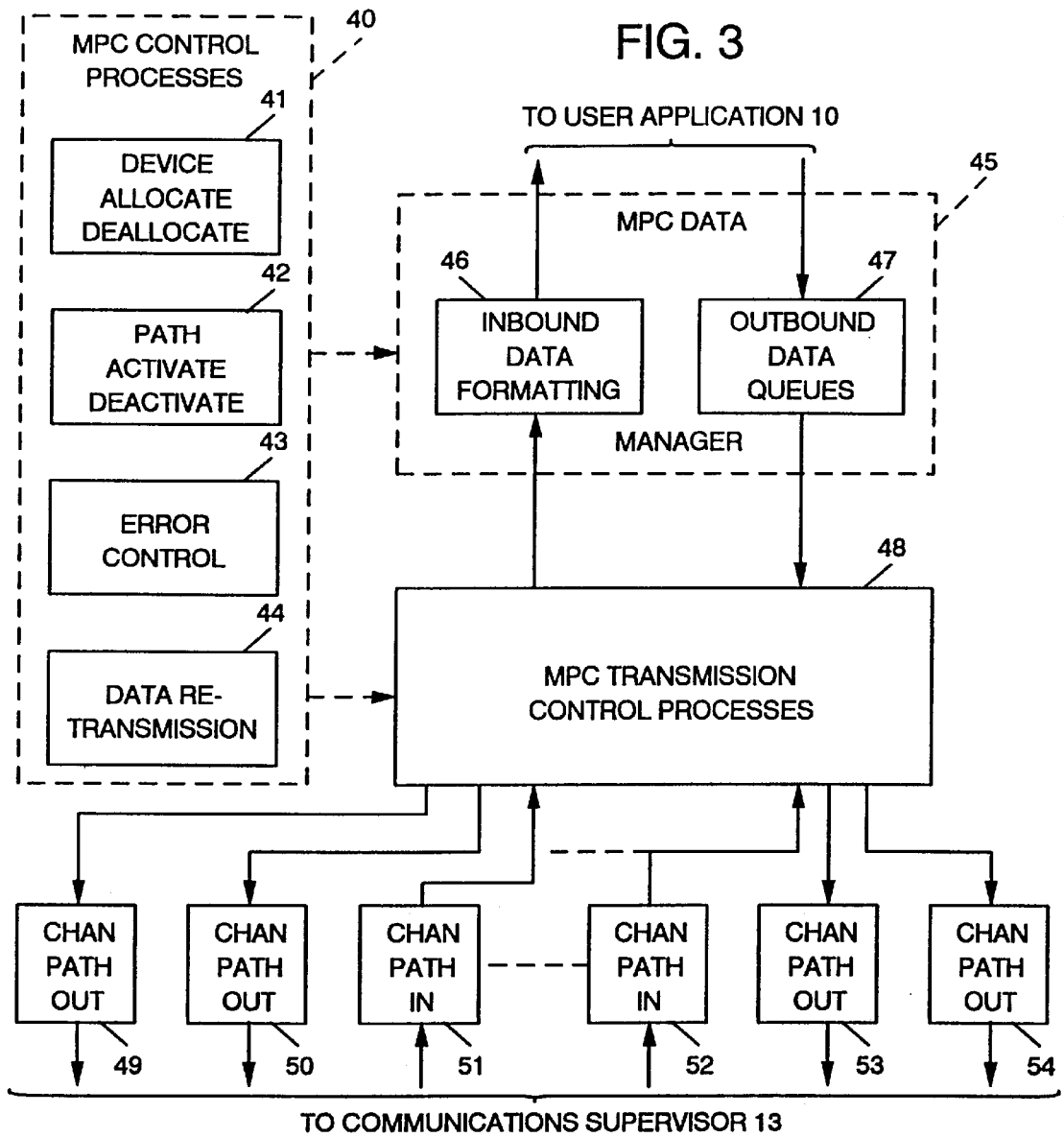
FIG. 3 shows a more detailed block diagram of the multi-path channel interface shown in FIG. 1, showing the architecture of the interface.

In FIG. 3 there is shown a more detailed block diagram of the multi-path channel interface 12 of FIG. 1 which includes three major components. MPC data manager 45 interfaces with the user application 10 of FIG. 1 and includes an outbound data formatting process 46 which converts the data and control stream from the user application 10 into blocks suitable for transmission on the available channel paths 22–24. Data manager 45 also includes inbound data queues which accept data from the remote end of the transmission paths 22–24 and store them for delivery to user application 10. A multi-path channel interface transmission control subsystem 48 interfaces the control and data signals from data manager 46 with a plurality of logical input and output sub-channels 49 through 54 over which input and output transmissions can take place. Note that the outputs of processes 48 are logical sub-channels which are unidirectional and suitable for the transmission of fixed sized transmission blocks varying from zero to 64 kilobytes in length. The prior art communications supervisor 13 (FIG. 1) converts these logical sub-channels into multiplexed physical transmission capacity on the physical channel paths 22–24, all in accordance with well known prior art procedures. It should be noted, however, that the logical sub-channels 49–54 shown in FIG. 3 need not be balanced and that more or fewer input channels can be combined with an unequal number of output channels.

Controlling data manager 45 and transmission control processes 48 are a set of MPC control processes 40. Included in processes 40 are a device or system allocate and de-allocate process 41 which utilizes control signals from user application 10 to allocate balanced or unbalanced multi-path channels to a user application. As noted above, these multi-path channel allocations merely verify that the requested transmission capabilities are available in the channel paths 22–24 (FIG. 1). Path activate and deactivate process 42 in FIG. 3 actually controls the exchange of signals which logically connect the allocated transmission groups to the user applications. Process 43 detects errors in received transmission data blocks, typically by detecting missing segments by noting missing segment numbers. Error control process 43 also responds to error messages from the remote device or system indicating missing or corrupted data segments at the remote device or system. Data re-transmission process 44 responds to the error control process 43 to re-transmit missing or corrupted data blocks, as will be described in more detail in connection with FIG. 11.

While the processes of FIG. 3 could be implemented with special purpose circuit elements in a manner obvious to persons of ordinary skill in the art, these processes are preferable implemented by programmed processes on the general purpose host computer 21. These processes will be described in detail in connection with the flow charts of FIGS. 9 through 11. It is believed that the actual programming of these processes are well within the abilities of any person of ordinary skill in the communications programming art from these flow charts and the following descriptions.

Figure 4:
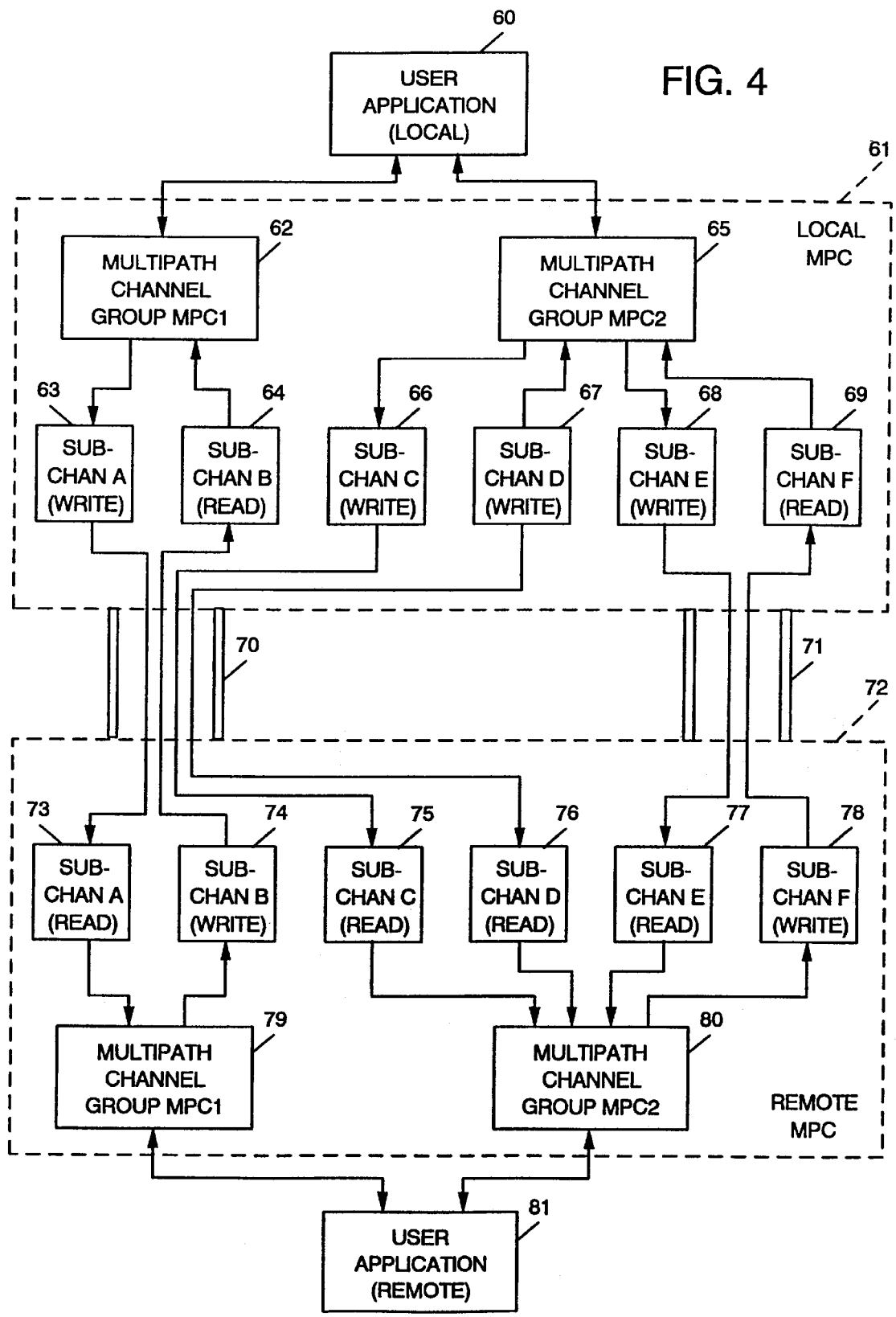
FIG. 4 shows a typical example of multi-path channel configurations which are created and which can be exploited by the multi-path channel interface of the present invention.

In FIG. 4 there is shown a graphical representation of a typical balanced and a typical unbalanced multi-path channel allocated by the multi-path channel interface of FIG. 3 in response to requests (allocate a multi-path channel) of the user application 10 of FIG. 1. User applications communicate with MPC 12 by means of messages implementing such functions as allocating or assigning sub-channels to a particular user application. Such allocations are merely logical reservations which are not activated until a different CCW (activate channel) signal is provided. The allocate channel message allows the user to specify transmission groups with any combination of sub-channels of any size and arbitrary direction of transmission. It is therefore possible for a user application to specify unbalanced multi-path channel groups in which the sizes of the read sub-channels are different from the sizes of the write sub-channels to accommodate unbalanced applications such as multimedia distribution. One such unbalanced transmission group is shown in FIG. 4.

For comparison purposes, a prior art balanced channel group TG1 group 62 is shown in FIG. 4, comprising a write sub-channel 63 and a read sub-channel 64, both served through a channel path 70. Channel path 70 may, of course, comprise an OEMI multiplexed byte mode multi-conductor cable transmission medium, an ESCON burst mode optical fiber cable, or any other transmission medium. It is assumed in FIG. 4 that local user application 60 is communicating with a remote user application 81 at the other end of transmission paths 70 and 71. It is also assumed that a remote multi-path channel interface 72 serves the remote user 81 in the same fashion that local MPC 61 serves local user 60. FIG. 4 is therefore entirely symmetrical.

Thus, write sub-channels 63, 66, 67 and 68 in local MPC 61 are read channels 73, 75, 76 and 77, respectively, in remote MPC 72 and read sub-channels 64 and 69 in local MPC 61 are write channels 74 and 78, respectively, in remote MPC 72. That is, each logical sub-channel is unidirectional. Moreover, multi-path channel groups 62 and 65 in local MPC 61 correspond precisely to multi-path channel groups 79 and 80, respectively, in remote MPC 72. The allocation and activation of the sub-channels of FIG. 4 is initiated at both the local user application 60 and the remote user application 81 and, indeed, can be initiated simultaneously at both user applications 60 and 81. A technique for resolving the ambiguities that might arise when the two ends of the transmission group attempt to simultaneously allocate or activate the transmission group therebetween is described in connection with FIG. 10. A technique for maintaining proper sequencing of data blocks in the face of multiple re-blocking of data to accommodate channel path failures is described in connection with FIG. 11.

Figure 5:
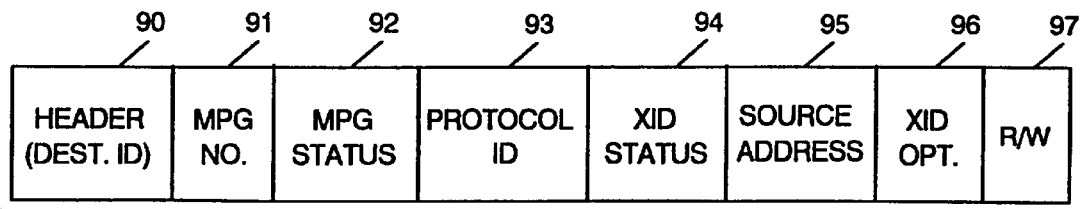
FIG. 5 shows the format of a typical exchange identification (XID) control signal which might be used in the multi-path channel interface system of the present invention for communication with a controller such as VTAM in an SNA packet network.
Figure 6:
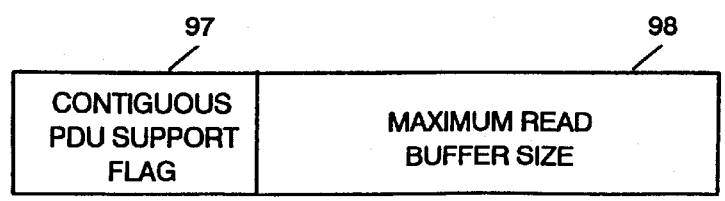
FIG. 6 shows an optional extension of the XID control signal format shown in FIG. 5 for indicating the maximum available read buffer size at the receiving end of an input-output transfer.

A user application such as user application 60 in FIG. 4 communicates with the multi-path channel interface such as interface 61 in FIG. by means of messages directing the MPC to allocate, activate, and deactivate multi-path channel groups, and to start sending data and complete sending data. In response to these signals, MPC 61 (or MPC 72) creates the logical multi-path channel groups, activates these groups for actual transmission of data and notifies the user to begin sending data or to begin receiving data. When the multi-path channel group is no longer needed, the group is deactivated and when the multi-path channel group is no longer valid, the group is de-allocated. Communication between the MPCs 61 and 72 is by way of exchange identification (XID) signals which convey the necessary information to the remote partner for enabling and disabling transmission paths. More particularly, one or more XID control signal blocks is launched on each sub-channel of a multi-path channel group to effectuate the activation of that sub-channel. Only after all of the sub-channels of a group are successfully activated at both ends is the user signaled to begin the transmission of data. In accordance with the present invention, these sub-channel activate signals include means for activating unbalanced transmission groups and for notifying the remote partner of currently available buffer and data link sizes, thereby permitting dynamic changes in the transmission group assignments to take advantage of, or to conform to, the currently available facilities. In FIGS. 5 and 6 there are shown a typical XID message used by the MPCs 61 and 72 of FIG. 4 to accomplish these results. Other XID formats for other purposes will be apparent to persons of ordinary skill in the art from the following discussion. Indeed, one of the major advantages of the present invention is the ability of the users to adapt the XID formats to accomplish specific purposes of the users and yet conform to the overall requirements of the MPC interface 12 of FIG. 1.

Thus, in FIG. 5 there is shown a graphical representation of the format of an XID message for activating a particular sub-channel of a multi-path channel group such as those shown in FIG. 4. The XID message of FIG. 5 comprises a header field 90 identifying the type of local station, the address of the destination and the length of the XID message. Field 91 carries an identification of the multi-path channel group to be activated while field 92 contains the status of the multi-path channel group (active or inactive). Field 93 contains an identification of a particular user protocol, for example, the SNA protocol. Field 93 could, of course, contain the identify of a different user protocol (e.g., DECNet or TCP/IP) in which case different information might be included and different processing of the XID messages called for. The protocol identification field 93 allows the same XID signal structure to be used with different protocols and thus makes the multi-path channel interface of the present invention totally independent of the user protocol.

Field 94 of the XID message of FIG. 5 contains the XID status (OK or NG) to be used as will be discussed in connection with FIG. 10 assist in correlating the operations at the two ends of the transmission group. The source address field 95 identifies the sender to the remote receiving MPC interface while the XID option field 96 identifies this message as an multi-path channel group channel activate signal. Field 97 identifies this channel as a read or write channel from the senders viewpoint and provides the basis for creating unbalanced transmission groups. That is, since an XID signal similar to that of FIG. 5 is transmitted on each sub-channel of the transmission group, the sending MPC has the capability of specifying unbalanced groups simply by specifying unbalanced read and write options in field 97.

The XID activate message of FIG. 5 can be optionally extended by the extension fields shown in FIG. 6 whenever the particular application requires such an extension. In the case illustrated in FIG. 6, it is assumed that the sender station does not necessarily know the size of the receiver buffers. It is therefore necessary for the two stations to specify the maximum buffer size available for reception of data blocks in field 98 of FIG. 6. Similarly, field 97 is used to notify the remote station that facilities are available locally to handle contiguous Protocol Data Units (PDUs). The buffer size and contiguous handling ability are important parameters in determining the size and frequency of the data transmissions on the channel group and are used by the multi-path channel interface of FIG. 3, and particularly transmission control processes 48 of FIG. 3, to appropriately block and transmit the user data.

It can be seen that the XID message of FIGS. 5 and 6 permit unbalanced transmission groups and dynamic negotiation of certain communication parameters at the time a transmission group is activated, all in accordance with the present invention. In addition, the possibility of formatting different XID messages for different user protocols makes the entire operation of the multi-path channel interface of the present invention independent of the protocol of the user application. This protocol independence permits a very wide variety of users to take advantage of the same MPC interface. Before proceeding to a detailed flow chart of the XID exchange in accordance with the present invention, the overall process will be described.

The process of allocating and activating a multi-path channel group is initiated in response to a request from the user application 10 of FIG. 1. This process, carried out in the local MPC interface, initially attempts to allocate the local communications facilities into a logical transmission group satisfying the request. Each of the local sub-channels is validated for availability. The physical transmission paths are then established to permit the transmission of a first phase exchange identification (XID-1) message between the local and remote MPC interfaces. The XID-1 message has the format described in connection with FIGS. 5–6, carrying mandatory and optional information about the transmission paths requested. This XID-1 message is replicated and transmitted over each of the sub-channels of the requested multi-path channel group. Meanwhile, at the remote end of the transmission medium, a similar user application will be requesting a similar multi-path channel group from the remote MPC interface, but conforming to the specific requirements of the remote user application. Since these requirements may be different from the requirements of the local user application, some mechanism for negotiating the parameter to be used is required. A second phase of XID exchanges (XID-2) will be used to resolve these differences. Note, however, that the prior art protocols need not know about the multiple XID exchanges and will simply be notified to initiate data transmission when the multiple exchanges are successfully completed.

At the remote MPC interface, the XID-1 messages received on each of the sub-channels of the transmission group are compared to each other to determine if they are identical. The remote MPC interface also verifies that XID-1 messages have been received over each of the sub-channels of the transmission group. The remote MPC interface also validates the size and direction of the requested sub-channels to determine if these facilities are available at the remote MPC interface. The local station, meanwhile is doing the same thing with the XID-1 messages received from the remote MPC. Both the local and the remote MPC interfaces also verify system integrity and system security fields in the received XID-1 messages. Finally, differences in requests for data handling parameters are resolved by whatever rules prescribed by the user application. Typically, however, buffer and data link sizes are always resolved downward to the lowest requested value. Once the fields of the received XID-1 messages are validated and adjusted, both the local and the remote MPC interfaces construct a tentative XID-2 message to confirm the values of the variable optional parameters. A random number generated locally for each XID-1 message and included in the XID-1 message is used to determine which MPC interface will actually initiate the second phase (XID-2) message exchange. The other MPC interface is saves the constructed XID-2 message until a comparison can be made when the XID-2 message is received from the other MPC interface.

If the XID-2 message is received and successfully validated at the receiving MPC interface, the two XID-2 messages are compared to determine if they are the same. If so, the saved XID-2 message is transmitted to the remote MPC interface for the validation and comparison at the remote MPC interface. Finally, if all validations and comparisons are successful, the two user applications are notified of the successful conclusion of the exchange identification process and data transmission can commence. If validation fails at any point in the process, the requested transmission group is taken down and the remote MPC interface notified to do the same. If a comparison of the XID-2 messages fails, the locally generated XID-2 message is used for confirmation. This process will be described in more detail in connection with FIGS. 9 and 10.

Figure 7:
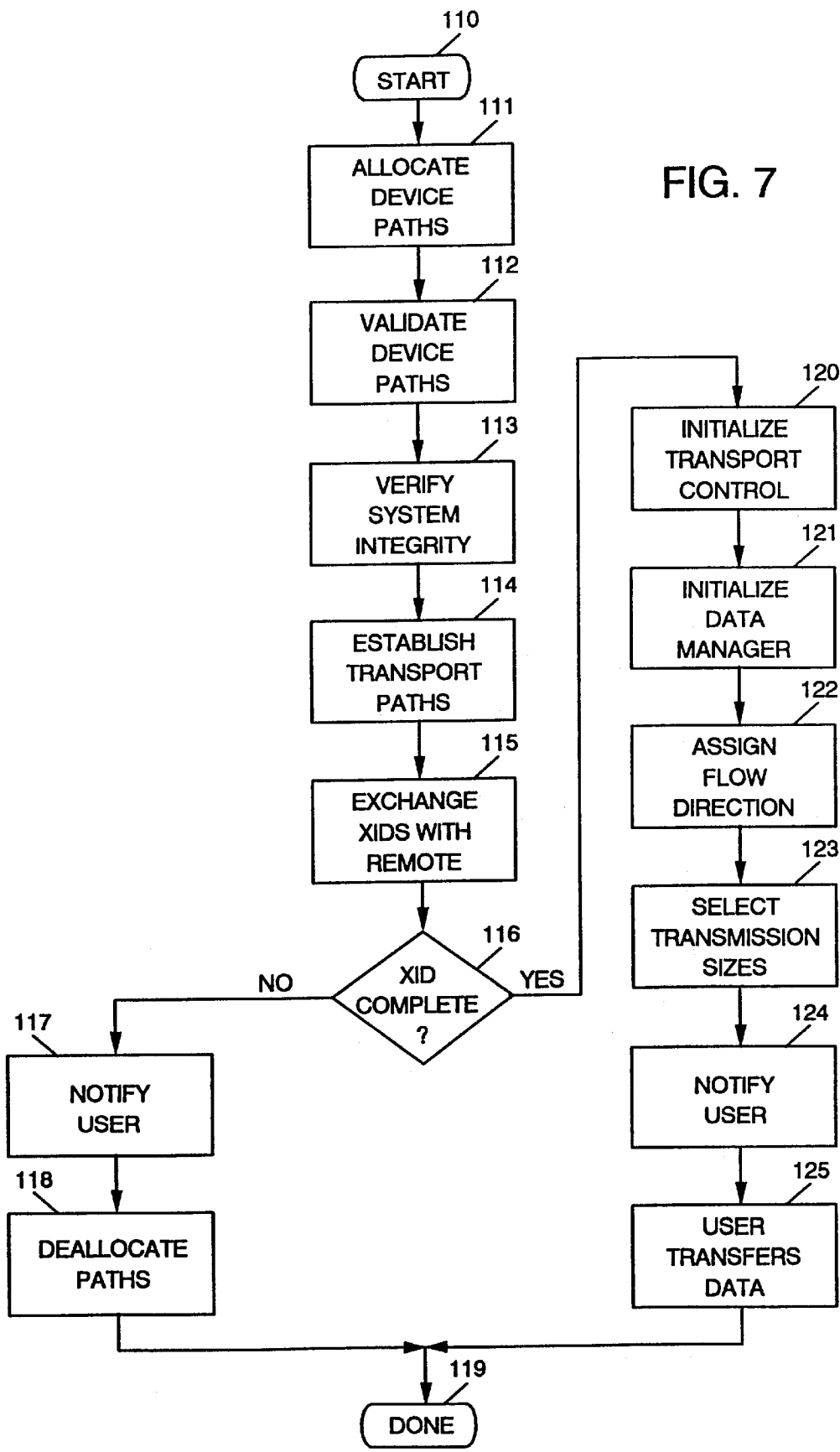
FIG. 7 shows a detailed flow chart of the process of sub-channel activation used by the multi-path channel interface of FIG. 3 in accordance with the present invention.

In FIG. 7 there is shown a flow chart of the activation of a multi-path channel group by the use of XID messages similar to that shown in FIGS. 5 and 6. The process of FIG. 7 must, of course, be concurrently carried out for each sub-channel of the requested multi-path channel group. Starting in start box 110, box 111 is entered where the paths are allocated in accordance with the request from the user application. Such requests may be for balanced or unbalanced multi-path channel groups corresponding, respectively to multi-path channel group MPC1 62 and MPC2 65 of FIG. 4. Indeed, more than one multi-path channel group can be requested for allocation, and only activated as required. Such allocations merely select and ensure the availability of sub-channels of the size and directions requested, but do not actually set up the multi-path channels. Thus, in box 112 the validity of the requested paths are checked. Finally, in box 113, the system integrity is verified. As noted above, the protocol identification fields, such as field 93 in FIG. 5, can include security information such as system identifications which are checked to determine whether or not communication is permitted with the remote end, i.e., to ensure that the requested multi-path channel group to the particular remote device or system is permissible under predetermined access rules. In box 114 the requested transport paths are actually activated, i.e., enabled for transmission. It is, of course, also possible to allocate multi-path channel groups statically by system declarations, as was done in the prior art, and merely activate these pre-established channel groups upon user request, as was also common in the prior art.

Once the sub-channels of a transmission group are physically enabled, one or more exchange identification (XID) messages are exchanged between the two ends of each sub-channel to prepare for the transmission of user data. As discussed in connection with FIGS. 5 and 6, part of this exchange may be to determine the user protocols and to negotiate desired transmission parameters such as buffer sizes or link sizes. A more detailed description of this exchange will be taken up in connection with the flow chart of FIG. 10. It is important to note, however, that this exchange takes place simultaneously over each sub-channel of the requested multi-path channel group to ensure the availability and the identity of both ends of the transmission sub-channel as well as of the necessary transmission parameters requested. Decision box 116 is then entered to determine if the XID exchange has completed successfully. If not, box 117 is entered to notify the user application that the requested channel group will not be activated for data transmission. Box 118 is then entered to de-allocate the transport paths established in box 114 for the XID exchange and the process terminates in terminal box 119. Note that this de-allocation requires a de-allocation message to the remote end of the transmission facility to ensure de-allocation at the other end. It is also important to note that the activation process represented by the flow chart of FIG. 9 can be initiated at either end of the transmission group and, indeed, can be initiated simultaneously at both ends of the transmission group.

If the XID exchange terminates successfully, as determined by decision box 116, box 120 is entered where the transport control processes 48 of the MPC interface of FIG. 3 are initialized to reflect the requested blocking sizes and blocking protocols requested or negotiated with the remote end of the transmission group. Box 121 is then entered to initialize the MPC data manager 45 (FIG. 3) to reflect the data queue 47 size requested or negotiated as well as the data formatting 46 requested. Box 122 is entered to assign the requested direction of transmission on the particular transmission sub-channel and box 123 is entered to select the transmission block size of this sub-channel. Note that boxes 122 and 123 imply the ability to dynamically assign both the direction of transmission as well as the sub-channel capacity at the time of activation. This is in stark contrast to the prior art where both direction of transmission and sub-channel size were statically predetermined and were merely activated at the time of the user request. It is important to note that this initialization of the MPC interface processes is simultaneously taking place at the remote MPC interface in response to the successful completion of the XID exchange.

When all of the sub-channel variables have been selected and implemented, box 124 is entered where the user application is notified of the availability of requested multi-path channel group. Box 125 can then be entered where the user application actually transfers data to the remote location over the allocated and activated channel group. The process of FIG. 9 then terminates in terminal block 119. Although not explicitly disclosed herein, a very similar process to that shown in FIG. 7 is used to de-activate and/or de-allocate the multi-path channel group once the data transmissions are complete or a transmission failure occurs.

Figure 8:
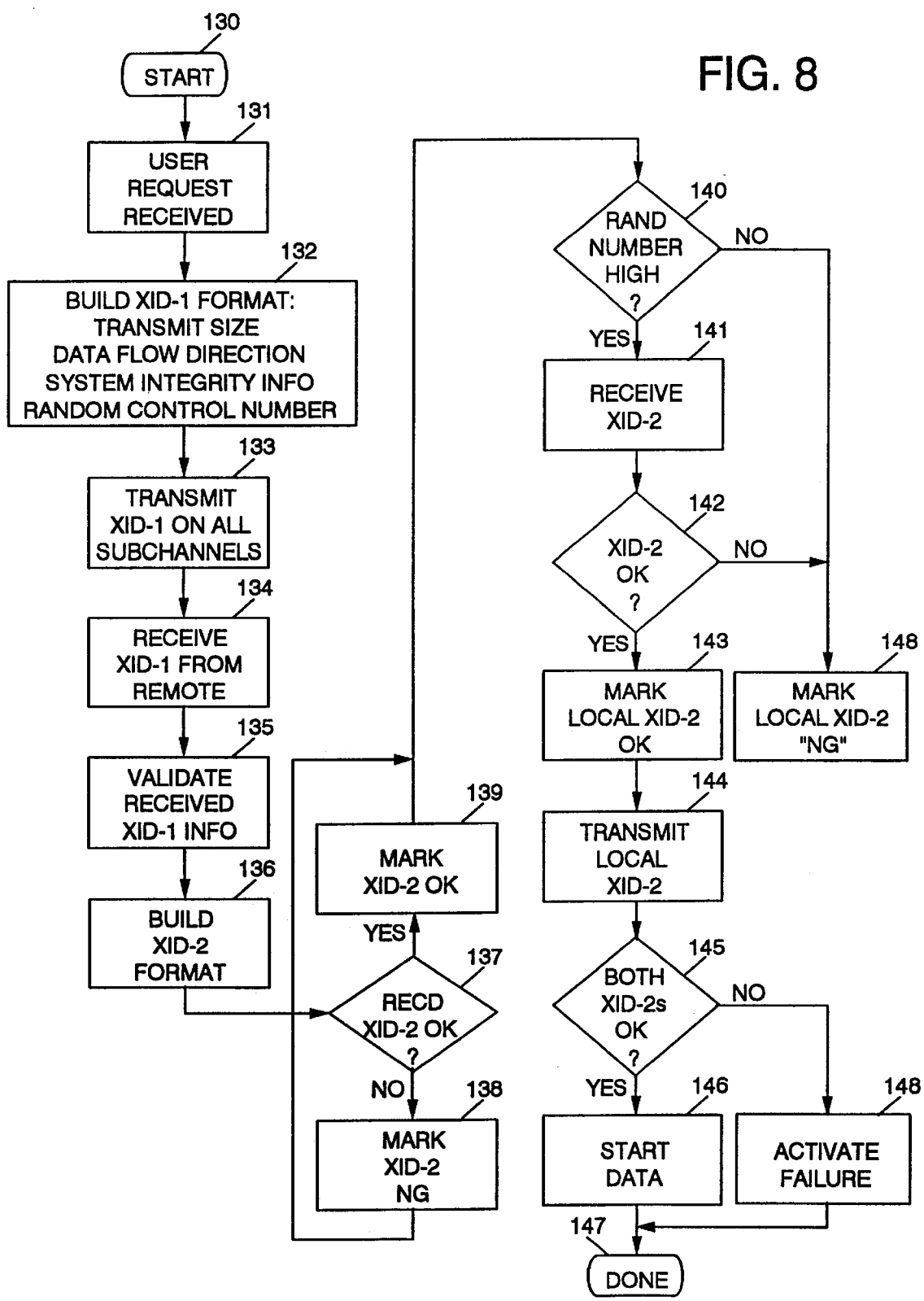
FIG. 8 shows a more detailed flow chart of the exchange of exchange identification (XID) signals used in he activation process of FIG. 9.

Referring more particularly to FIG. 8, there is shown a more detailed flow chart of the XID message exchange process which takes place in the box 115 of FIG. 7. In FIG. 10, starting in start box 130, box 131 is entered where the user request for a multi-path channel group is received. Note that this request can be received at the multi-path channel interfaces (FIG. 3) at both ends of the channel group simultaneously. Since this simultaneous issuance is the most difficult case, it is assumed in the flow chart of FIG. 10 that the MPCs at both ends of the transmission group request the activation of the multi-path channel group at the same time. In box 132, the XID-1 message format is built. For convenience, it is assumed that the XID message format is that shown in FIGS. 5 and 6. Other XID message formats could be used instead for another user application in a manner that is obvious to persons of ordinary skill in the art.

More particularly, in box 132 the transmit size of field 98 is set up as well as the direction of data flow in field 97. Appropriate system integrity information is supplied, when desired, to fields 90 and 91 of FIG. 5 and fields 31 and 35 of the headers of FIG. 2. In order to resolve the ambiguity which might arise from the simultaneous issuance of an XID-1 message at the MPCs at the two ends of the multi-path channel group, an ambiguity resolving signal is introduced into the sequence number field 30 of the header of FIG. 2. This ambiguity resolving signal is a randomly generated number in the illustrative embodiment. This random number will be used at the remote MPC interface to select which of the XID-1 messages will take control of the second phase of the activation process. Another method of resolving such an ambiguity include the use of a pre-defined table of rankings of terminal pairs, available at the two ends of each multi-path channel group.

Following the building of the XID-1 message in box 132, box 133 is entered where the XID message is transmitted on each sub-channel within the allocated multi-path channel group to the remote MPC interface. In box 134 this XID-1 message is received at the remote MPC interface and, in box 136, the parameters in the XID-1 message are validated. That is, the system integrity signals are used to ensure system integrity; the direction of transmission for this sub-channel and the size of the sub-channel are used to ensure availability of the sub-channel and the buffer parameter is used to determine if such facilities are available. Box 136 is then entered where the format of a second phase XID-2 message is built for transmission back to the local MPC interface. The format and field contents of the XID-2 message are identical to the XID-1 message, except for the variable buffer size parameter which may be modified to reflect the actual availability of these facilities. Decision box 137 is then entered where it is determined if the data in the received XID-1 message from the remote MPC interface is valid. If the validations of box 135 are all successful, box 139 is entered where the phase 2 XID-2 message is marked as "OK" in field 94 (FIG. 5). If the validations fail in any respect in box 135, the second phase XID-2 message is marked as "no good" (NG) in field 94. Whether the received XID-1 message is valid or invalid, decision box 140 is entered where the random number in the received XID-1 header segment number field 30 (FIG. 2) is compared to the random number generated for the locally issued XID-1 message. If the received random number is higher in value than the locally generated random number, box 141 is entered and the remote MPC interface waits for a second phase XID-2 message to be received from the remote MPC interface. When this response is received, decision box 142 is entered where the received phase 2 XID-2 message is validated in the same fashion as the original XID-1 message was validated in box 135.

If the received XID-2 message is identical to the locally generated XID-2 message, the locally generated XID-2 signal is marked as "OK" in box 143 and transmitted to the remote MPC interface in box 144 to complete the confirmation process. If the random number is lower in the locally generated XID-1 message, or if the validation of a received XID-2 message fails in decision box 142, box 148 is entered where the XID-2 message is marked as no good ("NG") and box 144 again entered to transmit the XID-2 message to the remote MPC interface. Decision box 145 is then entered to determine if both the local and the remotely generated XID-2 messages are okay. If so, box 146 is entered to notify the user to start transmitting user data. If not, box 143 is entered to activate a failure procedure as described in connection with FIG. 7. In both events, terminal box 147 is then entered to terminate the XID exchange process of FIG. 8 and return to the process of FIG. 7.

Although only two exchanges of XID messages are described in connection with FIG. 8, it is clear that only one exchange is necessary if no parameters need be negotiated for this transmission group. Similarly, if two or more interdependent parameters need to be negotiated before data transfer can begin, it is possible to utilize three or more XID exchanges to implement these negotiations. Such further extensions of the XID exchange process are obvious to persons of ordinary skill in the art and will not be further described here.

Figure 9:
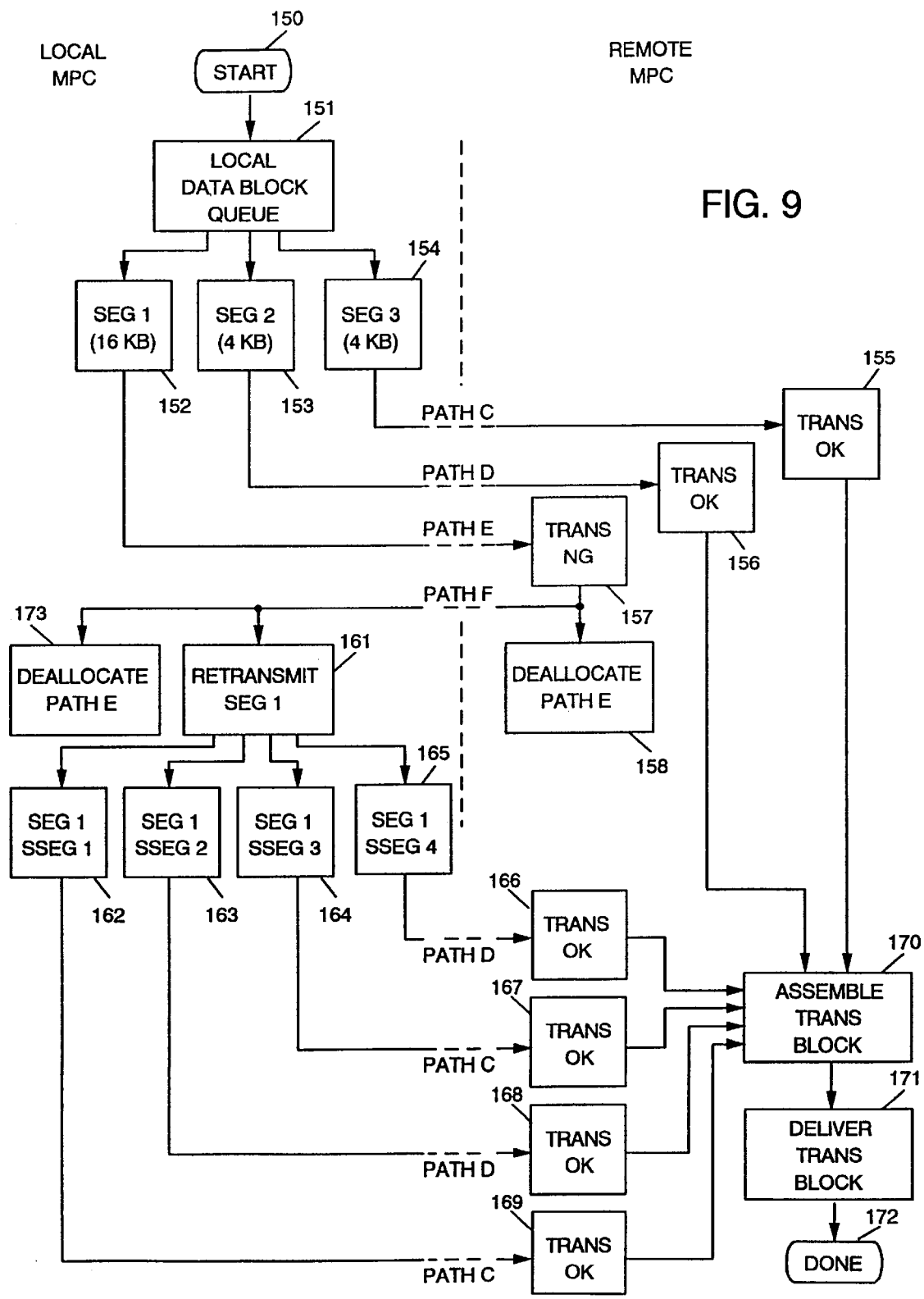
FIG. 9 shows a detailed flow chart of the segment sub-indexing process of the multi-path channel interface of FIG. 3, in accordance with the present invention, used when re-transmission of data segments must take place over sub-channels having a lower capacity than the capacity of the channel over which the original transmission of the segment took place.

Referring more particularly to FIG. 9, there is shown a flow chart of the data segment sub-indexing in accordance with the present invention. Starting at start box 150, box 151 is entered where a local data block is queued in the local MPC interface such as interface 12 of FIG. 1 and shown in more detail in FIG. 3. It is assumed that the XID message exchange has already taken place successfully between a local MPC interface 61 (FIG. 4) and a remote MPC interface 72 for all of the sub channels 66–69 of the transmission group MPC2 65–80. For the purposes of the flow chart of FIG. 9, it is assumed that the write sub-channels C and D (66–75 and 67–76 in FIG. 4) have a capacity of 4 kilobytes and will therefore take only data blocks of up to four kilobytes long. Write sub-channel E (68–77 in FIG. 3), on the other hand, has a capacity of 16 kilobytes and will therefore take data blocks of up to sixteen kilobytes long. It is assumed that the boxes in FIG. 9 to the left of the dashed vertical line are implemented at the local MPC interface 61 (FIG. 4) while the boxes to the right of the dashed vertical line are implemented at the remote MPC interface 72. These functions are, of course, implemented in a symmetrical fashion for transmissions in the opposite direction.

Returning to FIG. 9, box 152 formats a sixteen kilobyte block of data for transmission on path E while boxes 153 and 154 each format a four kilobyte block of data for transmission on paths D and C, respectively. It is assumed in FIG. 9 that the four kilobyte blocks transmitted on paths C and D are received successfully at the remote MPC in boxes 155 and 156, respectively. The sixteen kilobyte block transmitted on path E, however, is somehow lost (e.g., by the failure of channel path 70 of FIG. 4), as detected by box 157 at the remote MPC interface. If the block transmitted on path E is lost, as detected in box 157, box 158 is entered to de-allocate path E at the remote MPC interface. Since some failure has occurred in path E, it is important to remove this path from service.

The channel represented in FIG. 4 as Channel F (78-69 in FIG. 4) will present an error status indicating a path failure and identifying path E, all in accordance with the failure detection system of the prior art. At the local MPC interface, in box 173, path E is de-allocated at the local MPC interface in response to this failure message. Also in response to the failure message, re-transmit box 161 is entered where the lost data segment is re-transmitted to the remote MPC interface. However, since the sixteen kilobyte sub-channel E is no longer available in transmission group MPC2, the sixteen kilobyte data block must be broken up into four 4 kilobyte data sub-segments so that they can be transmitted over the available two 4 kilobyte sub-channels identified as paths C and D. In accordance with the present invention, four 4 kilobyte sub-segments are formed out of the original sixteen kilobyte block in boxes 162, 163, 164 and 165. Each of these four kilobyte sub-segments has a segment number added to field 32 of header 25 (FIG. 2) of the transmission block.

It is to be noted that the three data blocks formed in boxes 152, 153 and 154 include blocks numbers in field 30 of the header 25 of the data transmission block. The purpose of these segments numbers in field 30 is to allow the remote MPC interface to reassemble these data blocks in the proper order in the event that they are delivered to the remote MPC interface in some other order due to delay anomalies in the varying physical channel paths over which the sub-channels are derived. The sub-segment numbers in the re-transmitted blocks of boxes 162–165 serve the same function for the re-segmented re-transmitted data block. That is, if the four sub-segments generated in boxes 162–165 arrive at the remote MPC interface in some order than the originally transmitted order, the sub-segment numbers allow the remote MPC interface to re-assemble the sub-segments in the proper order for delivery to the ultimate user. Note the original segment number must be retained in sequence number field 30 (FIG. 2) to assure proper ordering of the original blocks.

What is claimed is:

1. An input and output communications subsystem for general purpose digital computer system comprising
at least one user application operating in said computer system according to a predetermined communications protocol to communicate data to a remote data utilization system over a communications channel having a plurality of sub-channels of limited transmission capacity;
means for segmenting said data into blocks for transmission over selected ones of said sub-channels, each selected sub-channel having a transmission capacity equal to or greater than each of said blocks assigned to that sub-channel;
means in said segmenting means for providing a segment number for each said block to identify the proper sequence of said each block;
means responsive to a failure of one of said sub-channels having a greater transmission capacity than at least one other of said sub-channels for resegmenting a block transmitted over said one failed sub-channel into sub-segments for transmission over said at least one other sub-channel, and;
means for adding sub-segment numbers to each of said sub-segments to facilitate re-assembly of said sub-segments into said block.

2. The input and output communications subsystem according to claim 1 further comprising
means for de-allocating said failed sub-channel at said computer system and at said data utilization system.

3. The input and output communications subsystem according to claim 1 further comprising
means for reassembling said sub-segments into said block and said blocks into said data as supplied by said user application by utilizing said segment and sub-segment numbers.

4. An input and output communications subsystem for general purpose digital computer system comprising
at least one user application operating in said computer system according to a predetermined communications protocol to communicate data to a remote data utilization system over a communications channel having a plurality of sub-channels of limited transmission capacity;
means for segmenting said data into blocks for transmission over selected ones of said sub-channels, each selected sub-channel having a transmission capacity equal to or greater than each of said blocks assigned to that sub-channel;
means in said segmenting means for providing a segment number for each said block to identify the proper sequence of said each block:
means responsive to a failure of one of said sub-channels having a greater transmission capacity than at least one other of said sub-channels for resegmenting a block transmitted over said one failed sub-channel into sub-segments for transmission over said at least one other sub-channel,
means for adding sub-segment numbers to each of said sub-segments to facilitate re-assembly of said sub-segments into said block, and
means for dynamically allocating said sub-channels with a dynamically determined transmission capacity and a dynamically determined direction of transmission.

5. A method for input and output communications for a general purpose digital computer system comprising the steps of
operating at least one user application in said computer system according to a predetermined communications protocol to communicate data to a remote data utilization system over a communications channel having a plurality of sub-channels of limited transmission capacity;
segmenting said data into blocks for transmission over selected ones of said sub-channels, each selected sub-channel having a transmission capacity equal to each of said blocks assigned to that sub-channel;
storing a segment number in each said block to identify the proper sequence of said each segment;
re-segmenting, in response to the failure of one of said sub-channels having a greater transmission capacity than at least one other of said sub-channels, blocks transmitted over said one failed sub-channel into sub-segments for transmission over said at least one other sub-channel, and;
adding sub-segment numbers to each of said re-segmented sub-segments to facilitate re-assembly of said sub-segments into said block.

6. The method according to claim 5 further comprising the step of
de-allocating said failed sub-channel at said computer system and at said data utilization system.

7. The method according to claim 5 further comprising the step of reassembling said sub-segments into said block of information as supplied by said user application by utilizing said sub-segment numbers.

8. A method for input and output communications for a general purpose digital computer system comprising the steps of
operating at least one user application in said computer system according to a predetermined communications protocol to communicate data to a remote data utilization system over a communications channel having a plurality of sub-channels of limited transmission capacity;
segmenting said data into blocks for transmission over selected ones of said sub-channels, each selected sub-channel having a transmission capacity equal to each of said blocks assigned to that sub-channel;
storing a segment number in each said block to identify the proper sequence of said each segment;
re-segmenting, in response to the failure of one of said sub-channels having a greater transmission capacity than at least one other of said sub-channels, blocks transmitted over said one failed sub-channel into sub-segments for transmission over said at least one other sub-channel;
adding sub-segment numbers to each of said re-segmented sub-segments to facilitate re-assembly of said sub-segments into said block, and
dynamically allocating said sub-channels with a dynamically determined transmission capacity and a dynamically determined direct of transmission.

9. A method executed by a first node for communicating data to a second node over a data channel, comprising the steps of
partitioning the channel into a plurality of sub-channels, each sub-channel having a negotiated capacity corresponding to the size of a packet which may be transmitted over it;
operating an application in the first node according to a predetermined communications protocol to send data to the channel;

segmenting the data for transmission over different ones of the sub-channels to the second node into blocks of individual sizes according to the sub-channel for which each block is assigned;

storing a segment number in each of the blocks to identify the proper order in which to reassemble to blocks to reconstitute the data;

in response to the failure of one of the sub-channels, re-segmenting blocks already formatted for transmission over the failed sub-channel into sub-segments for transmission over another sub-channel of lesser capacity; and adding a sub-segment number to each of the sub-segments to facilitate reassembly of said sub-segments into the original block.

10. Apparatus in a first node for communicating data to a second node over a data channel, comprising means for partitioning the channel into a plurality of sub-channels, each sub-channel having a negotiated capacity corresponding to the size of a packet which may be transmitted over it;

means for operating an application in the first node according to a predetermined communications protocol to send data to the channel;

means for segmenting the data for transmission over different ones of the sub-channels to the second node into blocks of individual sizes according to the sub-channel for which each block is assigned;

means for storing a segment number in each of the blocks to identify the proper order in which to reassemble to blocks to reconstitute the data;

means, responsive to the failure of one of the sub-channels, for re-segmenting blocks already formatted for transmission over the failed sub-channel into sub-segments for transmission over another sub-channel of lesser capacity; and means for adding a sub-segment number to each of the sub-segments to facilitate reassembly of the sub-segments into the original block.

11. A method executed by a local device for sending data to a remote device in blocks over one or more data channels partitioned into a plurality of subchannels, each subchannel being capable of handling blocks of a preassigned size which may be different from the sizes preassigned to others of the subchannels, each of the blocks having space for application data and a header containing a segment number field and a sub-segment number field, said method comprising the steps of partitioning the application data into data units and adding headers to form blocks, assigning each block to a subchannel for transmission, each block having a size appropriate to the subchannel to which it is assigned, storing a unique segment number in the segment number field of each block representing the order of the block in the application data, detecting a failed subchannel during transmission of the blocks, re-segmenting a failed block being transmitted over the failed subchannel into sub-segments, each having the same format as a block, appropriate for transmission over one or more of the remaining subchannels of lesser preassigned size than the failed subchannel, storing the segment number from the failed block in the segment number field of each of the sub-segments, storing a unique sub-segment number representing the order of the sub-segment in the failed block in the sub-segment field of each of the sub-segments, and transmitting the sub-segments over the respective assigned subchannels.

12. A local device for sending data to a remote device in blocks over one or more data channels partitioned into a plurality of subchannels, each subchannel being capable of handling blocks of a preassigned size which may be different from the sizes preassigned to others of the subchannels, each of the blocks having space for application data and a header containing a segment number field and a sub-segment number field, said local device comprising means for partitioning the application data into data units which when appended to headers form said blocks, means for assigning each block to a subchannel for transmission, each block having a size appropriate to the subchannel to which it is assigned, means for storing a unique segment number in the segment number field of each block representing the order of the block in the application data, means for detecting a failed subchannel during transmission of the blocks, means for re-segmenting a failed block being transmitted over the failed subchannel into sub-segments, each having the same format as a block, appropriate for transmission over one or more of the remaining subchannels of lesser preassigned size than the failed subchannel, means for storing the segment number from the failed block in the segment number field of each of the sub-segments, means for storing a unique sub-segment number representing the order of the sub-segment in the failed block in the sub-segment field of each of the sub-segments, and means for transmitting the sub-segments over the respective assigned subchannels.

* * * * *